US008935327B1

(12) United States Patent  
Agassy et al.

(10) Patent No.: US 8,935,327 B1  
(45) Date of Patent: Jan. 13, 2015

(54) SYSTEM, METHOD, AND COMPUTER PROGRAM FOR INTERFACING ASSETS OF AN ENTITY WITH A SOCIAL MEDIA SERVICE

(75) Inventors: Oren Agassy, Lavon (IL); Amit Braytenbaum, Jaffa (IL)

(73) Assignee: Amdocs Software Systems Limited, Dublin (IE)

( * ) Notice: Subject to any disclaimer, the term of this patent is extended or adjusted under 35 U.S.C. 154(b) by 312 days.

(21) Appl. No.: 13/192,371

(22) Filed: Jul. 27, 2011

(51) Int. Cl.  
*G06F 15/16* (2006.01)

(52) U.S. Cl.  
USPC ............ 709/204; 709/203; 709/225; 709/226

(58) Field of Classification Search  
USPC .................................. 709/204, 203, 225, 226  
See application file for complete search history.

(56) References Cited

U.S. PATENT DOCUMENTS

| | | | |
|---|---|---|---|
| 2012/0101881 A1* | 4/2012 | Taylor et al. ............... | 705/14.13 |
| 2012/0130863 A1* | 5/2012 | Tedjamulia et al. ......... | 705/27.1 |
| 2012/0239467 A1* | 9/2012 | Winters et al. ............... | 705/14.1 |
| 2013/0006733 A1* | 1/2013 | Fisher ........................ | 705/14.12 |
| 2013/0013383 A1* | 1/2013 | Vitti et al. .................. | 705/14.16 |
| 2013/0013416 A1* | 1/2013 | Stein ......................... | 705/14.66 |

OTHER PUBLICATIONS

ScreenTribe—Tune In. Get Rewarded., New to ScreenTribe?, 2010, retrieved from http://www.screentribe.com/.  
Wasserman, T., JetBlue Offers Rewards for Checking in on Facebook Places, Jan. 24, 2011, retrieved from http:// mashable.com/2011/01/24/jetblue-offers-rewards-for-checkin-facebook-places/.

* cited by examiner

*Primary Examiner* — Nicholas Taylor  
(74) *Attorney, Agent, or Firm* — Zilka-Kotab, PC

(57) ABSTRACT

A system, method, and computer program product are provided for interfacing assets of an entity with a social media service. In use, an entity containing one or more assets is identified. Additionally, a social media service is identified. Further, the one or more assets of the entity are interfaced with the social media service, such that actions performed with respect to the one or more assets of the entity are associated with the social media service, and actions performed with respect to the social media service are associated with the one or more assets of the entity.

16 Claims, 4 Drawing Sheets

SYSTEM, METHOD, AND COMPUTER PROGRAM FOR INTERFACING ASSETS OF AN ENTITY WITH A SOCIAL MEDIA SERVICE

FIELD OF THE INVENTION

The present invention relates to social media services, and more particularly to interfacing social media services with entity assets.

BACKGROUND

Social media services have become a popular method for communication. For example, as a current channel of choice for consumers, social media services have become a preferred communication and marketing platform. Unfortunately, conventional methods for expanding the functionality of social media services have exhibited various limitations.

For example, current entities may strive to exist and increase their footprint in the social domain in order to obtain benefits of social media service exposure, but they have failed to effectively interface the functionality of social media services with existing assets of the entity. There is thus a need for addressing these and/or other issues associated with the prior art.

SUMMARY

A system, method, and computer program product are provided for interfacing assets of an entity with a social media service. In use, an entity containing one or more assets is identified. Additionally, a social media service is identified. Further, the one or more assets of the entity are interfaced with the social media service, such that actions performed with respect to the one or more assets of the entity are associated with the social media service, and actions performed with respect to the social media service are associated with the one or more assets of the entity.

DETAILED DESCRIPTION

Figure 1:
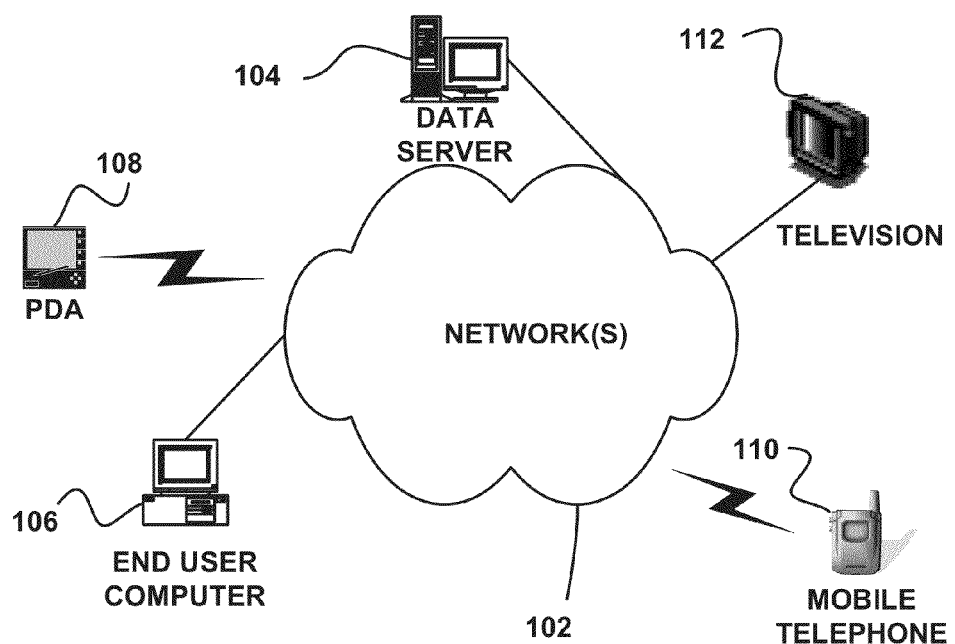
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
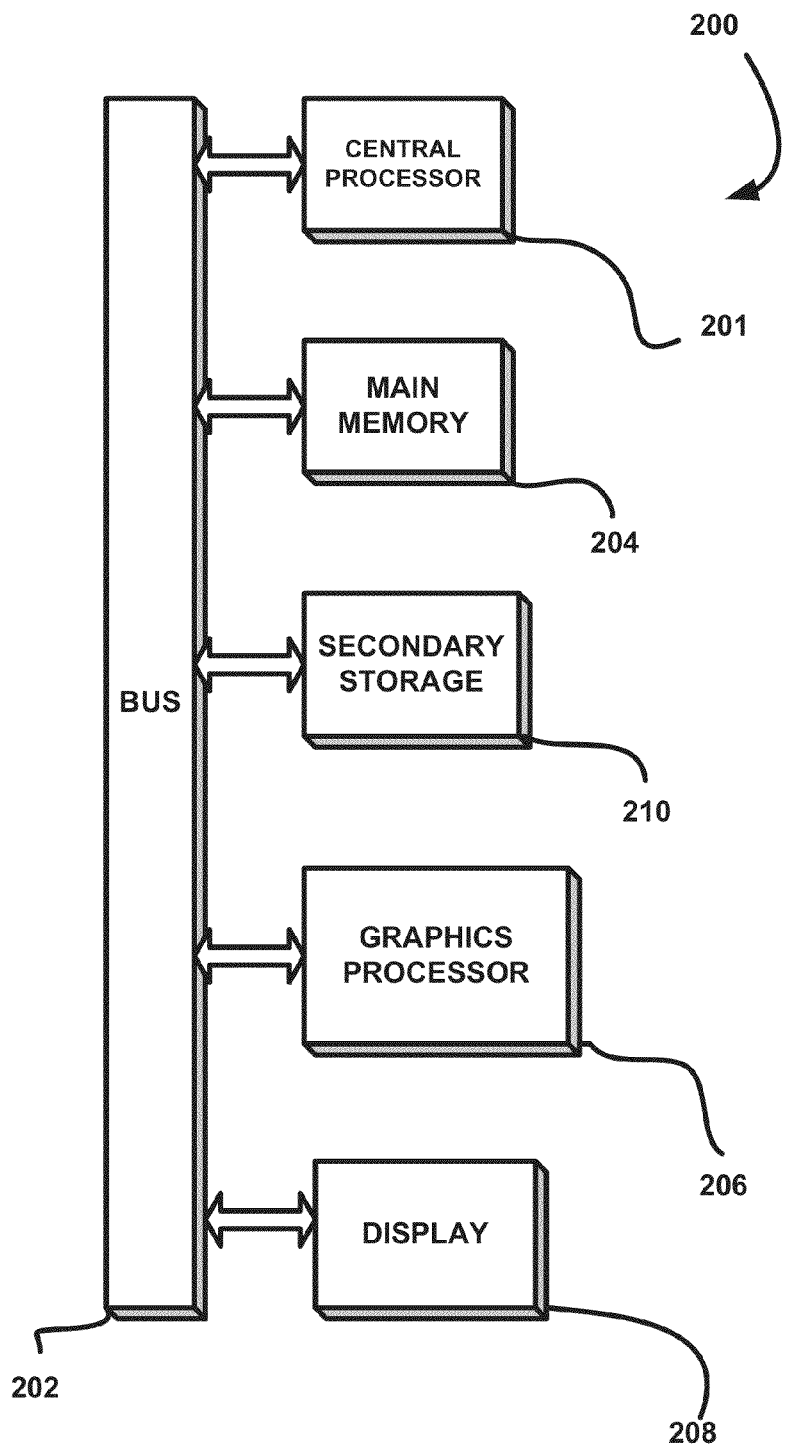
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 104) of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
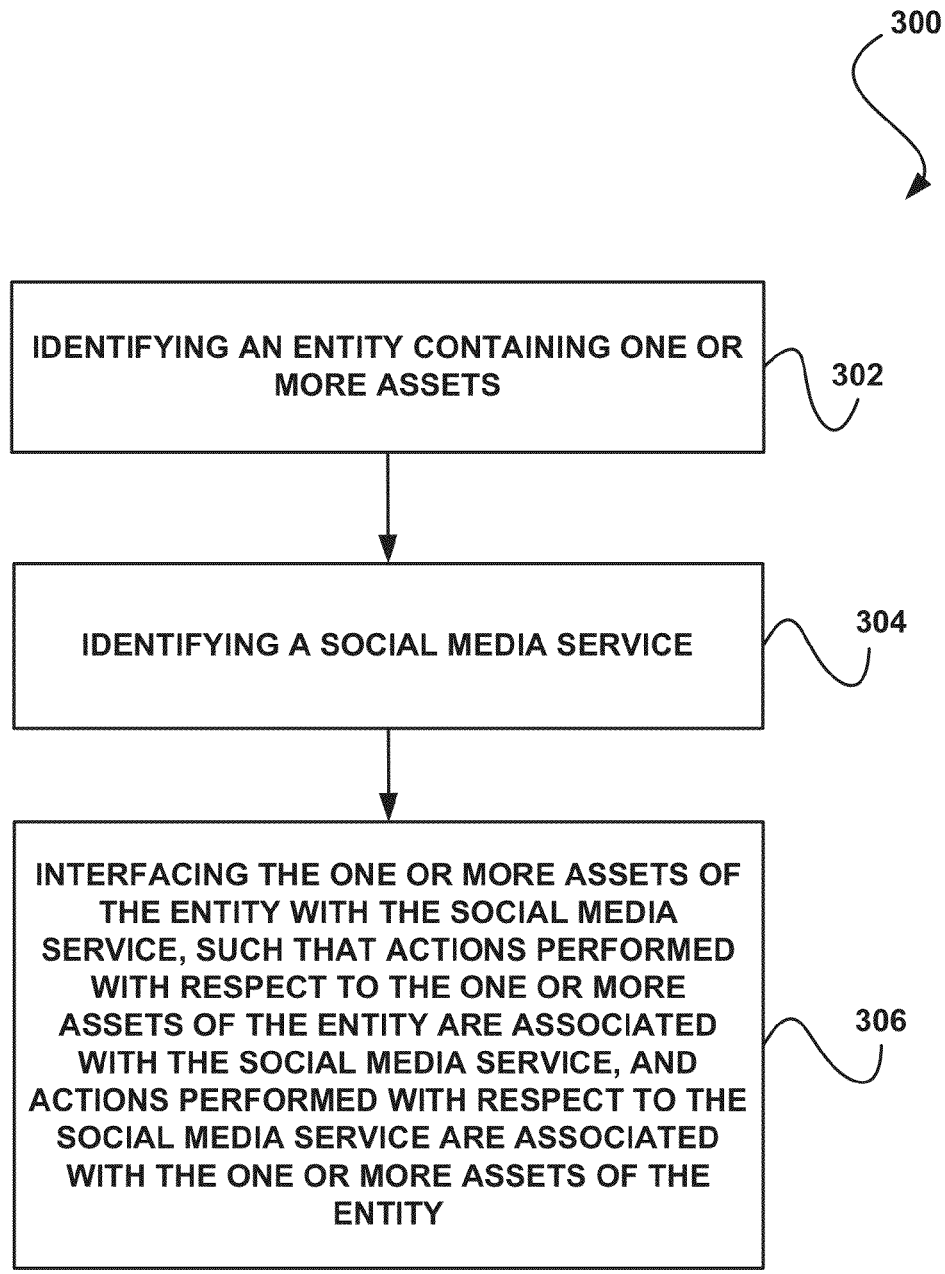
FIG. 3 illustrates a method for interfacing assets of an entity with a social media service, in accordance with one embodiment.

FIG. 3 illustrates a method 300 for interfacing assets of an entity with a social media service, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, an entity containing one or more assets is identified. In one embodiment, the entity may include a commercial entity. For example, the entity may include a commercial entity such as an enterprise, a brand, a corporation, a manufacturer, a service provider, etc. In another embodiment, the assets of the entity may include one or more products made available by the entity to one or more consumers. For example, the assets of the entity may include one or more tangible goods such as food, clothing, hardware, software, etc.

Additionally, in one embodiment, the assets of the entity may include one or more services provided by the entity to one or more consumers. For example, the assets of the entity may include server space, Internet hosting, pay per view (PPV) movies, digital video recording (DVR) services, network bandwidth, etc. In another embodiment, the assets of the entity may include one or more infrastructure elements of the entity that enable the entity to provide goods and/or services to consumers. For example, the assets of the entity may include one or more web pages associated with the entity, one or more servers that provide data storage and services, one or more interfaces for receiving consumer input, etc.

Further, as shown in operation 304, a social media service is identified. In one embodiment, the social media service may include any service through which two or more individuals interact socially. For example, the social media service may include a messaging service (e.g., an electronic mail message service, a short message service (SMS), an instant message service, etc.), a social networking service, a social game (e.g., a video game, a social pyramid game, etc.), an Internet forum, etc. In another embodiment, the social media service may be a public service (e.g., available to the general public, etc.), a private service (e.g., available only to a limited number of users, etc.), etc.

Further still, in one embodiment, the social media service may be associated with the entity. For example, the social media service may be created and/or provided by the entity. In another embodiment, the social media service may not be associated with the entity. For example, the social media service may be created and/or provided by another entity other than the identified entity.

Also, as shown in operation 306, the one or more assets of the entity are interfaced with the social media service, such that actions performed with respect to the one or more assets of the entity are associated with the social media service, and actions performed with respect to the social media service are associated with the one or more assets of the entity. In one embodiment, the interfacing may be performed utilizing an engine. For example, the interfacing may be performed utilizing a hardware engine, a software engine, an engine including hardware and software, etc.

In addition, in one embodiment, the interfacing may be performed by accessing the one or more assets of the entity and accessing the social media service utilizing one or more protocols. For example, the one or more assets of the entity may be accessed utilizing a predefined protocol provided by the entity. In another example, the social media service may be accessed utilizing one or more application programming interfaces (APIs).

Further, in one embodiment, the interfacing may include transmitting data between the one or more assets of the entity and the social media service. For example, data associated with a user of the social media service (e.g., contact information, interests of the user, activities of the user, etc.) may be transmitted to a server associated with the entity. In another example, data associated with the one or more assets of the entity (e.g., customer product and/or service consumption data, customer location data, etc.) may be transmitted to the social media service.

Further still, in one embodiment, the interfacing may include performing one or more actions utilizing the one or more assets of the entity, in response to one or more actions performed in association with the social media service. In another embodiment, the one or more actions may be performed according to one or more rules, predetermined objectives, services to be provided, etc. For example, the engine may receive a notification that a user has performed a certain task through the social media service (e.g., the user has completed a game within the service, has input information via the service, etc.). Additionally, in response to the notification, the engine may send a request to the entity for a product or service to be made available to the user.

Also, in one embodiment, the interfacing may include performing one or more actions within the social media service, in response to one or more actions performed in association with the one or more assets of the entity. In another embodiment, the one or more actions may be performed according to one or more rules, predetermined objectives, services to be provided, etc. For example, the engine may receive a notification that a customer has purchased or utilized a good or service from the entity, and in response to the notification, the engine may update an element of the social media service associated with the customer (e.g., a customer's profile, status, etc.).

In this way, the one or more assets of the entity may be leveraged in order to enhance the social media service. Additionally, the social media service may be used to improve one or more aspects of the entity (e.g., through brand exposure, advertising, customer service, etc.).

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
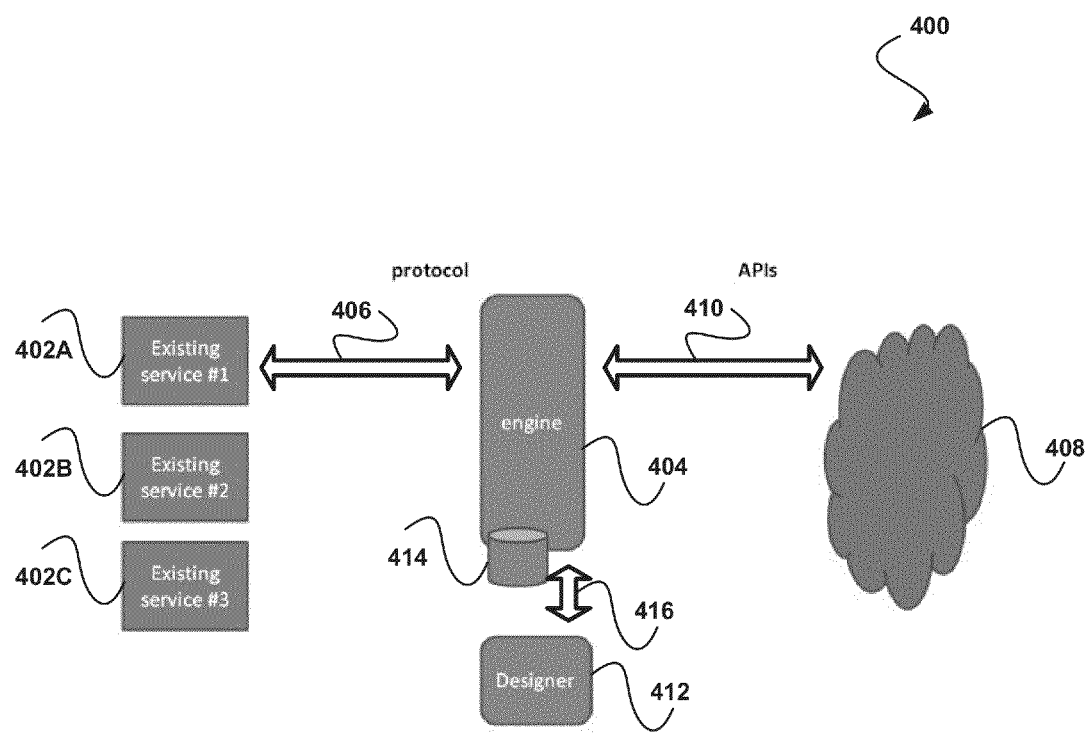
FIG. 4 illustrates an exemplary architecture for interfacing assets of an entity with a social media service, in accordance with another embodiment.

FIG. 4 illustrates an exemplary architecture 400 for interfacing assets of an entity with a social media service, in accordance with another embodiment. As an option, the architecture 400 may be implemented in the context of the details of FIGS. 1-3. Of course, however, the architecture 400 may be implemented in any desired environment. Further, the aforementioned definitions may equally apply to the description below.

As shown, the architecture 400 includes a plurality of services 402A-C in communication with an engine 404 via one or more communication protocols 406. In one embodiment, the plurality of services 402A-C may include assets that exist within an entity (e.g., existing services, legacy services, etc.). For example, the plurality of services 402A-C may include one or more real world assets (e.g., one or more commercial products, services, etc.).

Additionally, in one embodiment, the one or more communication protocols 406 may include any protocol that enables communication of data between the plurality of services 402A-C and the engine 404. For example, the one or more communication protocols 406 may include one or more predefined protocols that are implemented by the plurality of services 402A-C in order to communicate with the engine 404.

In another embodiment, the one or more communication protocols 406 may be used by the engine 404 to perform one or more actions associated with the plurality of services 402A-C. For example, the one or more communication protocols 406 may be used by the engine 404 to determine a status of one or more of the plurality of services 402A-C. In another example, the one or more communication protocols 406 may be used by the engine 404 to provision tasks to one or more of the plurality of services 402A-C. In yet another example, the one or more communication protocols 406 may be used by the engine 404 to redeem a tangible good or service from one or more of the plurality of services 402A-C.

Also, in another example, the one or more communication protocols 406 may be used by the engine 404 to retrieve registration information from one or more of the plurality of services 402A-C. In yet another example, the one or more communication protocols 406 may be used by the engine 404 to retrieve registration information from one or more of the plurality of services 402A-C.

Further, the engine 404 is in communication with a social media service 408 via an application programming interface (API) 410. In one embodiment, API 410 may include an existing public social media API that may enable the communication of data between the engine 404 and the social media service 408. For example, the engine 404 may utilize the API 410 to connect with the social media service 408 and/or publish data into the social world and communicate with end users via the social media service 408. For instance, the engine 404 may utilize the API 410 to provide status reports, wall reports, rewards publication, and/or other information to the social media service 408. In another example, the engine 404 may utilize the API 410 to retrieve link hits (e.g., selection of links, etc.) from the social media service 408.

Further still, in another embodiment, the engine 404 may use the one or more communication protocols 406 as well as the application programming interface (API) 410 to interface the plurality of services 402A-C and the social media service 408. For example, the engine 404 may utilize the one or more communication protocols 406 as well as the application programming interface (API) 410 to implement a social activity (e.g., a game, an objective, etc.) within the social media service 408 that utilizes assets of the plurality of services 402A-C.

Also, in one embodiment, the social activity created by the engine 404 may enable users of the social media service 408 to perform one or more activities. For example, the social activity created by the engine 404 may enable users of the social media service 408 to perform one or more tasks utilizing the social media service 408, view progress towards one or more goals utilizing the social media service 408, earn recognition within the social media service 408, etc.

In another embodiment, the social activity created by the engine 404 may enable a communication exchange based on a user's existing network and relationships within the social media service 408. For example, one or more existing profiles within the social media service 408 that are associated with the user may be used to communicate information associated with the user to the user's network. In yet another embodiment, the social activity created by the engine 404 may be associated with a theme. For example, the social activity created by the engine 404 may have a content or plot that dictates actions to be taken by users, desired results of such actions, rules associated with games, etc.

In addition, an activity designer user interface (UI) 412 is in communication with the engine 404 via a connection 416. In one embodiment, the activity designer UI 412 may be used by an activity designer to create one or more social activities that include activity rules that may control activity flow and may interface services from the plurality of services 402A-C and the social media service 408 within the one or more social activities. Further, a database 414 is in communication with the engine 404. In one embodiment, the database 414 may store data associated with one or more social activities created and communicated by the activity designer UI 412.

In this way, the plurality of services 402A-C and the social media service 408 may be manipulated by the engine 404 to create a social activity that will connect users of the plurality of services 402A-C as well as the social media service 408. Additionally, as opposed to the virtual social world, the plurality of services 402A-C may provide real world assets that may be leveraged to push the social activity forward to increase potential revenue and awareness for entities associated with the plurality of services 402A-C.

For example, users of the social media service 408 may redeem virtual and/or social currency and awards awarded by the social media service 408 (e.g., an award given by a game within the social media service 408, etc.) for tangible good and/or services provided by the plurality of services 402A-C such as credits for a predetermined amount of free short message service (SMS) messages, increased bandwidth, etc. In another example, customer knowledge (e.g., subscriber information, location, etc.) may be retrieved from the plurality of services 402A-C and may be used to personalize a social activity provided to the users. For instance, information retrieved by the engine 404 from the plurality of services 402A-C may indicate that a user has a family plan and teenage children, and the engine 404 may use such information to provide a parental control mode for the social activities provided to such user through the social media service 408.

Furthermore, in one embodiment, the engine 404 may provide electronic programming guide (EPG)-based social games for cable and digital television (DTV) providers. For example, the plurality of services 402A-C may include an EPG server, one or more digital video recorders (DVRs), a pay per view (PPV) server, and a provisioning server of a service provider. Additionally, the social media service 408 may include an application for a social networking service.

Also, in one embodiment, utilizing the engine 404, the application for the social networking service may have direct access to the service provider's EPG server, and may expose data such as upcoming programs to users of the application. In this way, users of the application may keep an eye on upcoming programs, manage DVR and PPV usage, and get reminders associated with the plurality of services 402A-C through the application of the social media service 408.

In addition, in one embodiment, the engine 404 may expose the way a user is using the EPG to friends of the user within the social media service 408. For example, viewing preferences of the user obtained by the engine 404 from the plurality of services 402A-C may be shared across the application of the social media service 408, which may allow friends of the user within the social media service 408 to see what the user is planning to watch within the plurality of services 402A-C. For instance, when a user updates an EPG setting for their account, a message associated with the user may be published within the application of the social media service 408 describing the update (e.g., by stating that the user is planning on watching a particular show using a particular service provider, etc.).

Further, in one embodiment, the engine 404 may notify friends of the user within the social media service 408 when the user views a program provided by the plurality of services 402A-C. For example, upon checking in to view a program (e.g., by selecting the program within a DVR, etc.), a message associated with the user may be published within the application of the social media service 408 describing the program being currently viewed by the user (e.g., by stating that the user is currently watching a particular program, episode, etc. using a particular service provider, etc.). In another embodiment, the message may be published automatically, manually, etc.

In yet another embodiment, additional options may be included within the message associated with the user. For example, the message may contain a link to record the program to a DVR of another user (e.g., in case the other user missed the program), a link to subscribe to a service provided by the service provider (e.g., if the other user does not have DVR services, etc.), etc. In still another embodiment, the user may be able to see preferences associated with their friends, programs currently being viewed by their friends, etc. In yet another embodiment, the user may be able to communicate with their friends through a standard social media infrastructure or over the application.

Further still, in one embodiment, the engine 404 may account for usage within both the plurality of services 402A-C and the social media service 408, and may reward such usage (e.g., through the dissemination of credits, virtual goods, tangible goods, etc. For example, the engine 404 may distribute points to the user when the user performs activities including one or more of sharing, checking in, contributing, and socializing within one or more of the plurality of services 402A-C and the social media service 408. In another example, the engine 404 may credit the user with virtual points for each activity that the user participates in.

In another embodiment, in addition to virtual point credit, users may earn badges upon fulfilling specific tasks (e.g., recording a predetermined number of shows on a DVR, responding to a publication a predetermined number of times, etc.), where such badges may be shown within the social environment of the user through the social media service 408. In yet another embodiment, different variations for a user's score collection may be used. For example, a point counter or points associated with a user may be applied to a category, and if a user shares a program, their score in sharing may be increased.

In still another embodiment, virtual credit (e.g., virtual points, etc.) may be used by the user to purchase virtual goods or tangible goods. For example, virtual credit may be used by the user to purchase virtual goods such as special badges that are displayed within the social media service 408. In another example, virtual credit may be redeemed by the user for tangible assets such as PPV movies, cellular phone minutes, flowers, popcorn, etc. that are provided by one or more entities associated with the plurality of services 402A-C or by the plurality of services 402A-C themselves.

Also, in one embodiment, the engine 404 may incorporate additional functionality associated with the social activity. For example, general purpose calendars, social games, location-based (e.g., global positioning system (GPS)-based, etc.) games, contextual advertisements from television and movie studios, etc. may all be incorporated within or associated with the social activity created by the engine 404. Further, the engine 404 may include a light billing platform that may manage redemption of virtual points.

In this way, one or more entities that provide the plurality of services 402A-C may offer the social activity to their customers. Additionally, stickiness may exist between the availability of the EPG and the social activity provided by the engine 404. Further, exposure of the social activity through the social media service 408 may enable a "viral" transmission of data associated with the plurality of services 402A-C.

Further still, new knowledge about subscribers of the plurality of services 402A-C may be obtained (e.g., based on their interests within the social media service 408, etc.). Also, virtual goods earned through the use of the social media service 408 may be redeemed for tangible partner goods through the plurality of services 402A-C, and may account for user events obtained through the social media service 408 (e.g., by offering discounted flowers for mother's day, birthdays, etc.).

Additionally, in one embodiment, the plurality of services 402A-C may be associated with an existing online store. For example, through the engine 404, the online store may be converted to incorporate social aspects, such as assigning virtual points to users for recommendations and highly rated reviews. Further, user's purchase and/or viewing history may be made available to friends of the user through the social media service 408, group buys may be enabled, and virtual points may be redeemed for coupons. Further still, social media preferences may be synchronized with a purchase history of the user (e.g., by adding a musician whose album was purchased by the user to the user's social profile, etc.). Also, audio messages may be shared with friends by the user, gifts may be purchased by the user for friends, etc.

In addition, in one embodiment, the plurality of services 402A-C may be associated with a navigation service. For example, through the engine 404, a social game may be added to the navigation service. Further, a place may be identified within a group of friends utilizing the navigation service. Further still, quests may be created and joined, history trivia may be conducted, points may be earned by a user if a predetermined amount of friends are in the same area as the user or if the user and/or a predetermined number of friends are in a predetermined location, etc. Also, upon entering a particular store, the navigation service may detect such entry and a message associated with the user may be published within the application of the social media service 408 describing the store being currently visited by the user.

In this way, an entity may leverage prior investments towards new, trendy activities. Additionally, the entity may position itself as innovative. Further, the entity may create and utilize a revenue and customer service API. Further still, the entity may gain new knowledge about existing subscribers. Also, targeted marketing may be integrated into and/or from social platforms. In addition, an on-line footprint, as well as profile attributes, may be consolidated with an existing customer profile. Furthermore, total cost of ownership (TCO) may be reduced by leveraging existing assets of the entity.

Further still, in one embodiment, existing assets of an entity may be converted into a social game. For example, web activities, services for users, customer relationship management (CRM) systems, etc. may be converted into awareness and revenue generating social activities. This may increase the footprint of the entity in the social domain in order to achieve viral exposure, stickiness, traffic, outgoing channels, and to gain knowledge about users of the entity.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer readable medium, comprising:
   computer code for identifying one or more assets including one or more services provided by an entity to a user;
   computer code for retrieving information regarding the user from the entity, where the information includes an indication that the user has one or more teenage children and subscribes to a family plan associated with the one or more assets;
   computer code for creating a social activity that is displayed within a social media service separate from the entity to the user, including:
      providing one or more tasks to be performed by the user utilizing the social media service and the one or more assets, and
      providing a parental control mode within the social activity in response to retrieving the indication that the user has one or more teenage children and subscribes to the family plan associated with the one or more assets;
   computer code for identifying a usage of one or more of the assets of the entity by the user;
   computer code for publishing a notification of the identified usage within the social media service;
   computer code for identifying additional usage by the user within the social media service;
   computer code for comparing the usage of the one or more assets of the entity and the additional usage within the social media service to the one or more criteria of the social activity; and
   computer code for performing one or more actions associated with the user within the social media service, if the usage of the one or more assets of the entity and the additional usage within the social media service meet the one or more criteria of the social activity.

2. The computer program of claim 1, wherein the social media service is created by the entity.

3. The computer program of claim 1, wherein the social media service is created by another entity other than the identified entity.

4. The computer program of claim 1, wherein the one or more actions are performed utilizing an engine.

5. The computer program of claim 1, wherein the one or more actions are performed by accessing the one or more assets of the entity and accessing the social media service utilizing one or more protocols.

6. The computer program of claim 5, wherein the one or more assets of the entity are accessed utilizing a predefined protocol provided by the entity.

7. The computer program of claim 5, wherein the social media service is accessed utilizing one or more application programming interfaces (APIs).

8. The computer program of claim 1, wherein identifying the usage of one or more of the assets of the entity and identifying additional usage by the user within the social media service includes transmitting data between the one or more assets of the entity and the social media service.

9. The computer program of claim 4, wherein if the usage of the one or more assets of the entity and the additional usage within the social media service meet the one or more criteria of the social activity, the engine sends a request to the entity for a product or service to be made available to the user.

10. The computer program of claim 4, wherein in response to a notification that a customer has purchased or utilized a good or service from the entity, the engine updates an element of the social media service associated with the customer.

11. The computer program of claim 10, wherein the assets of the entity include one or more infrastructure elements of the entity that enable the entity to provide goods and/or services to consumers.

12. A method, comprising:
   identifying one or more assets including one or more of products and services provided by an entity to a user;
   retrieving information regarding the user from the entity, where the information includes an indication that the user has one or more teenage children and subscribes to a family plan associated with the one or more assets;
   creating a social activity that is displayed within a social media service separate from the entity to the user, including:
      providing one or more tasks to be performed by the user utilizing the social media service and the one or more assets, and
      providing a parental control mode within the social activity in response to retrieving the indication that the user has one or more teenage children and subscribes to the family plan associated with the one or more assets;
   identifying a usage of one or more of the assets of the entity by the user;
   publishing a notification of the identified usage within the social media service;
   identifying additional usage by the user within the social media service;
   comparing the usage of the one or more assets of the entity and the additional usage within the social media service to the one or more criteria of the social activity; and
   performing one or more actions associated with the user within the social media service, if the usage of the one or more assets of the entity and the additional usage within the social media service meet the one or more criteria of the social activity.

13. A system, comprising:
   a processor for:
      identifying one or more assets including one or more of products and services provided by an entity to a user;
      retrieving information regarding the user from the entity, where the information includes an indication that the user has one or more teenage children and subscribes to a family plan associated with the one or more assets;
      creating a social activity that is displayed within a social media service separate from the entity to the user, including:
         providing one or more tasks to be performed by the user utilizing the social media service and the one or more assets, and
         providing a parental control mode within the social activity in response to retrieving the indication that the user has one or more teenage children and subscribes to the family plan associated with the one or more assets;
      identifying a usage of one or more of the assets of the entity by the user;
      publishing a notification of the identified usage within the social media service;
      identifying additional usage by the user within the social media service;
      comparing the usage of the one or more assets of the entity and the additional usage within the social media service to the one or more criteria of the social activity; and
      performing one or more actions associated with the user within the social media service, if the usage of the one or more assets of the entity and the additional usage within the social media service meet the one or more criteria of the social activity.

14. The system of claim 13, wherein the processor is coupled to memory via a bus.

15. The computer program of claim 1, wherein publishing the notification of the identified usage within the social media service includes updating a profile of the user.

16. The computer program of claim 1, wherein publishing the notification of the identified usage within the social media service includes publishing a message associated with the user within the social media service.

* * * * *